United States Patent
Kawahara et al.

(10) Patent No.: US 7,487,467 B1
(45) Date of Patent: Feb. 3, 2009

(54) VISUAL REPRESENTATION AND OTHER EFFECTS FOR APPLICATION MANAGEMENT ON A DEVICE WITH A SMALL SCREEN

(75) Inventors: Hideya Kawahara, Mountain View, CA (US); Yoojin Hong, San Jose, CA (US); Paul Byrne, Los Altos, CA (US); Frank E. Ludolph, Menlo Park, CA (US); Curtis J. Sasaki, Sunnyvale, CA (US); Eitaro Nishijima, Tokyo (JP)

(73) Assignee: Sun Microsystems, Inc., Santa Clara, CA (US)

( * ) Notice: Subject to any disclaimer, the term of this patent is extended or adjusted under 35 U.S.C. 154(b) by 385 days.

(21) Appl. No.: 11/159,951

(22) Filed: Jun. 23, 2005

(51) Int. Cl.
*G06F 3/00* (2006.01)

(52) U.S. Cl. .................. 715/810; 715/762; 715/864; 715/866

(58) Field of Classification Search ............... 715/810, 715/819–821, 835–838, 864, 866, 762, 764, 715/767; 725/40, 41; 348/563, 564, 473
See application file for complete search history.

(56) References Cited

U.S. PATENT DOCUMENTS

| | | | | |
|---|---|---|---|---|
| 5,303,388 A * | 4/1994 | Kreitman et al. | ............ | 715/836 |
| 5,598,523 A * | 1/1997 | Fujita | ......................... | 715/840 |
| 5,751,373 A * | 5/1998 | Ohyama et al. | ............... | 725/59 |
| 5,901,366 A * | 5/1999 | Nakano et al. | .......... | 455/550.1 |
| 6,097,393 A * | 8/2000 | Prouty et al. | ................ | 345/419 |
| 6,133,905 A * | 10/2000 | Edo et al. | .................... | 345/156 |
| 6,137,487 A * | 10/2000 | Mantha | ...................... | 715/767 |
| 6,538,670 B1 * | 3/2003 | Kido | .......................... | 715/767 |
| 6,597,391 B2 * | 7/2003 | Hudson | ..................... | 348/153 |
| 6,754,660 B1 * | 6/2004 | MacPhail | .................... | 707/100 |
| 7,127,679 B2 * | 10/2006 | Cohen | ........................ | 715/744 |
| 7,170,510 B2 * | 1/2007 | Kawahara et al. | ........... | 345/419 |
| 2002/0093535 A1 * | 7/2002 | Murphy | ..................... | 345/764 |
| 2003/0004983 A1 * | 1/2003 | Cohen | ........................ | 707/500 |
| 2003/0064757 A1 * | 4/2003 | Yamadera et al. | .......... | 455/566 |
| 2004/0039934 A1 * | 2/2004 | Land et al. | .................. | 713/200 |
| 2004/0250278 A1 * | 12/2004 | Imai et al. | ..................... | 725/40 |
| 2005/0108657 A1 * | 5/2005 | Han | .......................... | 715/827 |
| 2006/0229116 A1 * | 10/2006 | Ishihara et al. | ........... | 455/575.3 |
| 2007/0035523 A1 * | 2/2007 | Cohen | ........................ | 345/169 |

FOREIGN PATENT DOCUMENTS

JP     2002-215286 A  *  7/2002

* cited by examiner

*Primary Examiner*—Tadeese Hailu
(74) *Attorney, Agent, or Firm*—Park, Vaughan & Fleming LLP

(57) ABSTRACT

One embodiment of the present invention provides a system and a method for presenting a set of icons in a display so that the icons can be selected by a user via a keypad. During operation, the display presents a set of icons to the user. The user can then select an icon from the set of icons by entering input into the keypad. The set of icons are presented in the display such that the spatial layout of the set of icons is substantially the same as the layout of the keypad, resulting in an intuitive interface that allows the user to select desired choices quickly and easily.

22 Claims, 10 Drawing Sheets

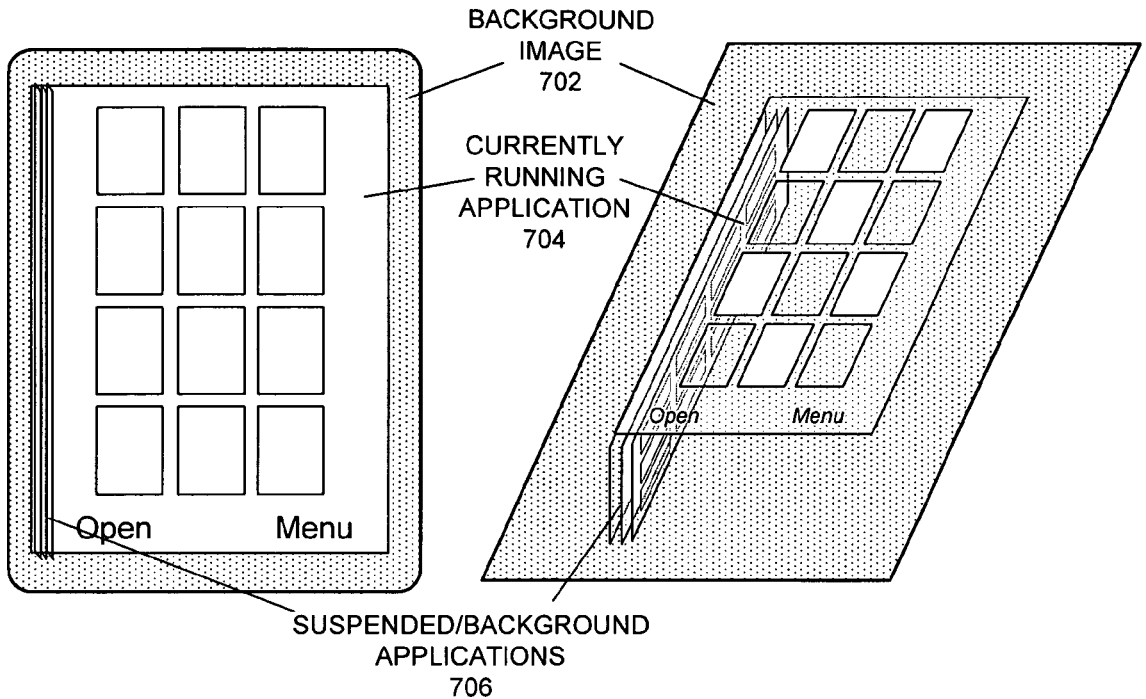
FIG. 7A          FIG. 7B
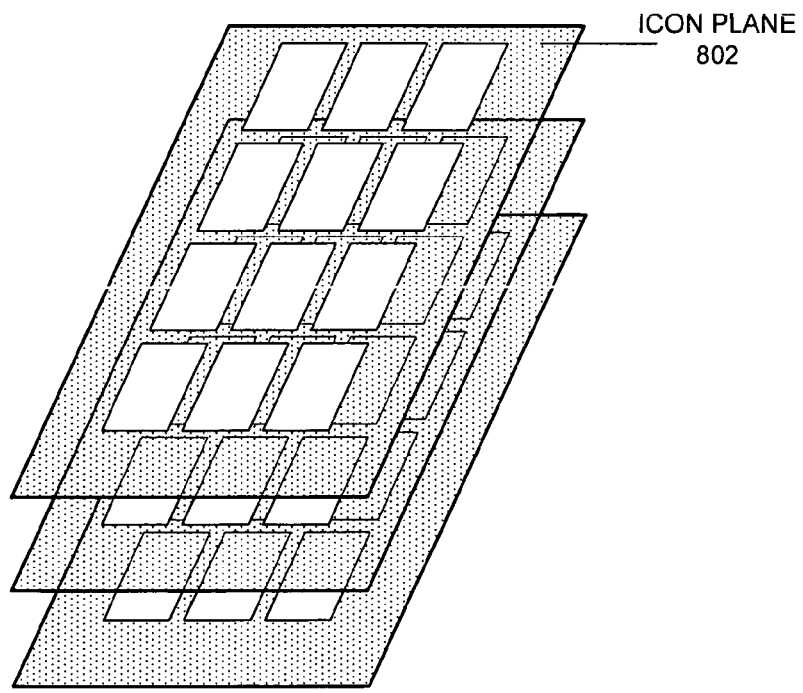
FIG. 8

VISUAL REPRESENTATION AND OTHER EFFECTS FOR APPLICATION MANAGEMENT ON A DEVICE WITH A SMALL SCREEN

BACKGROUND

1. Field of the Invention

The present invention relates to user-interfaces for computer systems. More specifically, the present invention relates to a method and an apparatus that uses advanced graphics rendering capability to solve user interaction issues in selecting and running multiple applications on screens with physical size limitations.

2. Related Art

The Internet has made seamless access to information a common facet in the everyday life of millions of computer users. Advances in communications and computing technology have led to dramatic changes in the way and the frequency with which people access information, and have led to an expectation that data should be accessible anywhere and at any time via mobile devices. As a result, devices such as mobile phones, PDAs (Personal Digital Assistants), and car navigation systems have grown to become increasingly sophisticated. While such devices have in the past supported only a limited number of applications run serially, they have begun to evolve to include a larger number of applications, with multiple applications running concurrently.

Attempts to apply the set of interface techniques developed for personal computers to mobile devices have led to user-interface issues. For example, due to physical limitations in screen size, individual mobile applications typically fill the entire screen. The combination of screen size and computing constraints make it a challenge to display multiple applications and to cleanly switch between applications. For example, abrupt application changes can give the user a false impression that an application has terminated. Other metaphors for displaying current running applications, such as a taskbar (common on desktops) or a key-triggered application list (common on palm-pilot PDAs), also suffer in such an environment.

Ongoing hardware developments offer potential for improvement. Some devices have incorporated unique input methods, such as a jog dial and touch screen, as well as advanced output methods, such as stereo sound. The latest high-end mobile phones include a three-dimensional (3D) accelerator that provides a significant improvement in graphics rendering capability. However, to date such graphics capabilities have primarily been used to display "eye candy," and have not led to changes in the user-interface paradigm.

Hence, what is needed is a method and an apparatus that remedies the above-described interaction issues on small devices.

SUMMARY

One embodiment of the present invention provides a system and a method for presenting a set of icons in a display so that the icons can be selected by a user via a keypad. During operation, the display presents a set of icons to the user. The user can then select an icon from the set of icons by entering input into the keypad. The set of icons are presented in the display such that the spatial layout of the set of icons is substantially the same as the layout of the keypad, resulting in an intuitive interface that allows the user to select desired choices quickly and easily.

In a variation on this embodiment, presenting the set of icons involves presenting a visual cue in proximity to each icon that associates the icon with a corresponding button on the keypad.

In a variation on this embodiment, an action is executed in association with the selection of the icon. Executing the action involves providing visual feedback to the user in order to provide a smooth context switch between a set of actions. A further variation involves presenting a visual transition that simulates view (eye point) movement in a 3D space and efficiently provides the user with a mental model of concurrent applications in the 3D. In a further variation, executing the action involves presenting a second set of icons to the user in the display. A further variation presents a first background image in conjunction with the first set of icons and a second background image in conjunction with the second set of icons. Changing the background images when the associated icons change provides visual context to the user.

In a variation on this embodiment, the display has a currently-focused icon which is highlighted. In this variation, selecting the icon involves transferring the highlight from the currently-focused icon to the selected icon. A set of directional buttons on the keypad can be activated by the user to transfer the highlight to the selected icon.

In a variation on this embodiment, the keypad can be a telephone keypad or a touch-sensitive display device.

In a variation on this embodiment, the set of icons can include three-dimensional images.

In a variation on this embodiment, the set of icons can include multiple planes of icons layered over each other and rendered using translucency so that the multiple planes of icons are simultaneously visible.

In a variation on this embodiment, the number of times each icon in the set of icons has previously been chosen is tracked, and this information is used to optimize future presentation of the set of icons.

BRIEF DESCRIPTION OF THE FIGURES

FIG. 7A illustrates a mechanism for displaying sets of icons following a book metaphor, viewed from top-down, in accordance with an embodiment of the present invention.

FIG. 7B illustrates a mechanism for displaying sets of icons following a book metaphor, viewed from a side angle, in accordance with an embodiment of the present invention.

FIG. 8 illustrates multiple planes of icons layered over each other and rendered using translucency in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drivers, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The User-Interface of a Mobile Device

Figure 1:
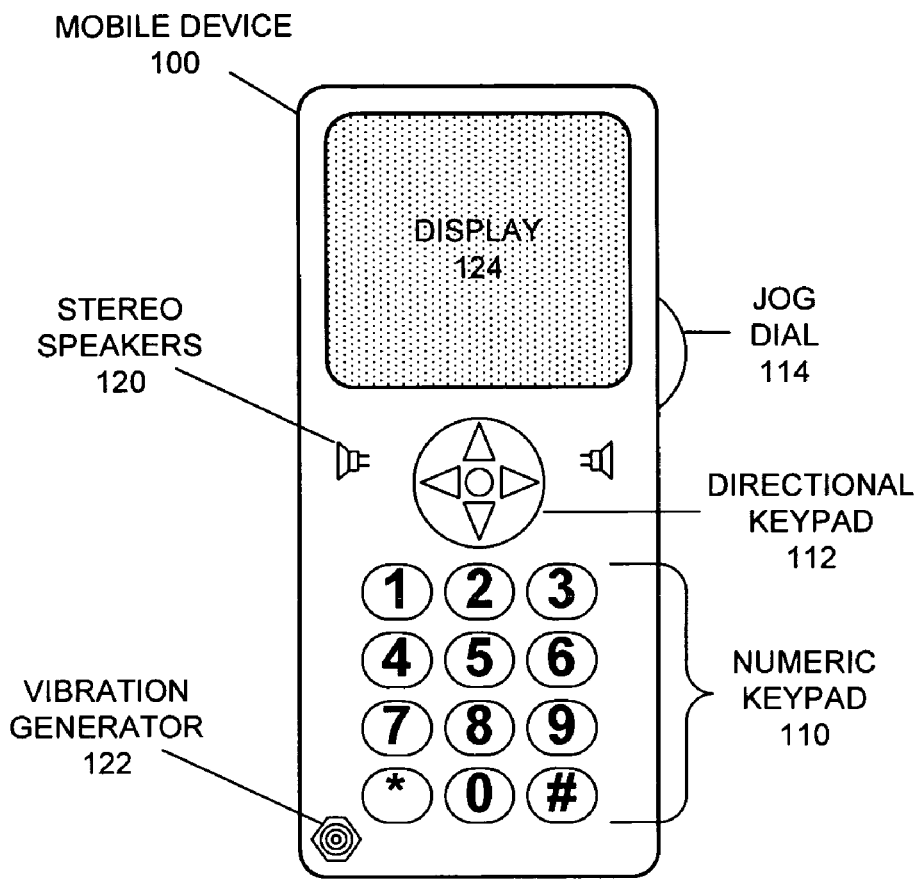
FIG. 1 illustrates the components of a sample mobile device in accordance with an embodiment of the present invention.

FIG. 1 illustrates the components of a sample mobile device 100 in accordance with an embodiment of the present invention. Device 100 can include a number of input mechanisms, including but not limited to, a numeric keypad 110, a directional keypad 112, and a jog dial 114. Mechanisms for generating output can include stereo speakers 120, a vibration generator 122, and a display screen 124. Device 100 can also include mechanisms to communicate with other devices or computer systems via a wired network or wireless network connection.

Figure 2:
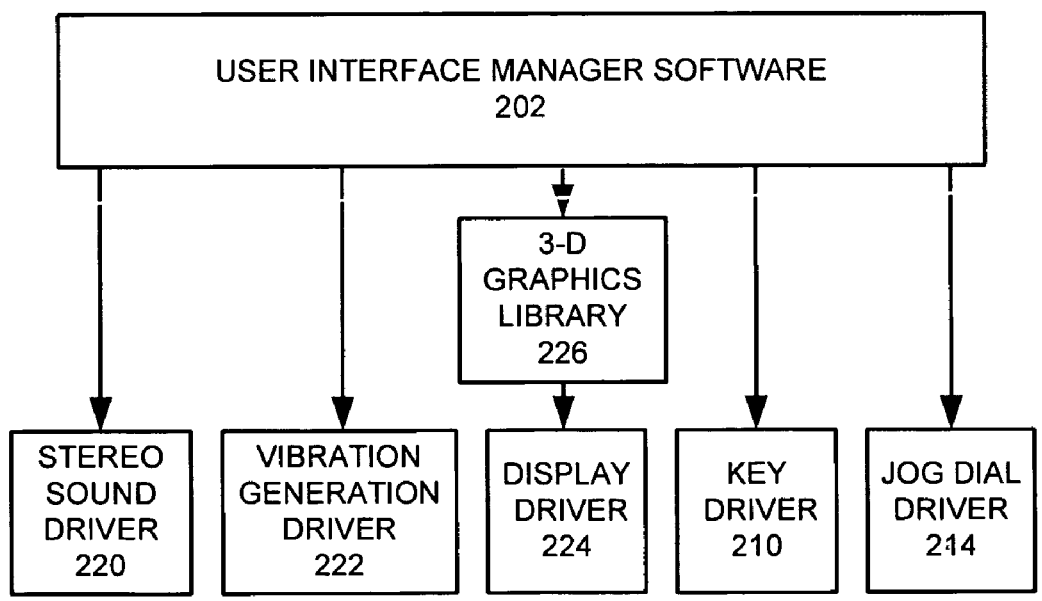
FIG. 2 illustrates the logical layout of the user-interface software for a mobile device in accordance with an embodiment of the present invention.

FIG. 2 illustrates the logical layout of the user-interface software for a mobile device in accordance with an embodiment of the present invention. The user-interface manager software 202 interacts with a set of libraries and device drivers to communicate with the user. Inputs from the directional keypad 112 and numeric keypad 110 are received by the key driver 210. Similarly, input from the jog dial 114 is received by the jog dial driver 214. The stereo-sound driver 220 and vibration-generation driver 222 send output to the stereo speakers 110 and vibration generator 120, respectively. The user-interface manager software utilizes a 3-dimensional graphics library 226 to present 3-dimensional output to the display driver 224, which in turn displays the graphical output on the display screen. The 3-D graphics library used can include, but is not limited to, OpenGL, OpenGL ES, and DirectX.

Selection Process

Figure 3:
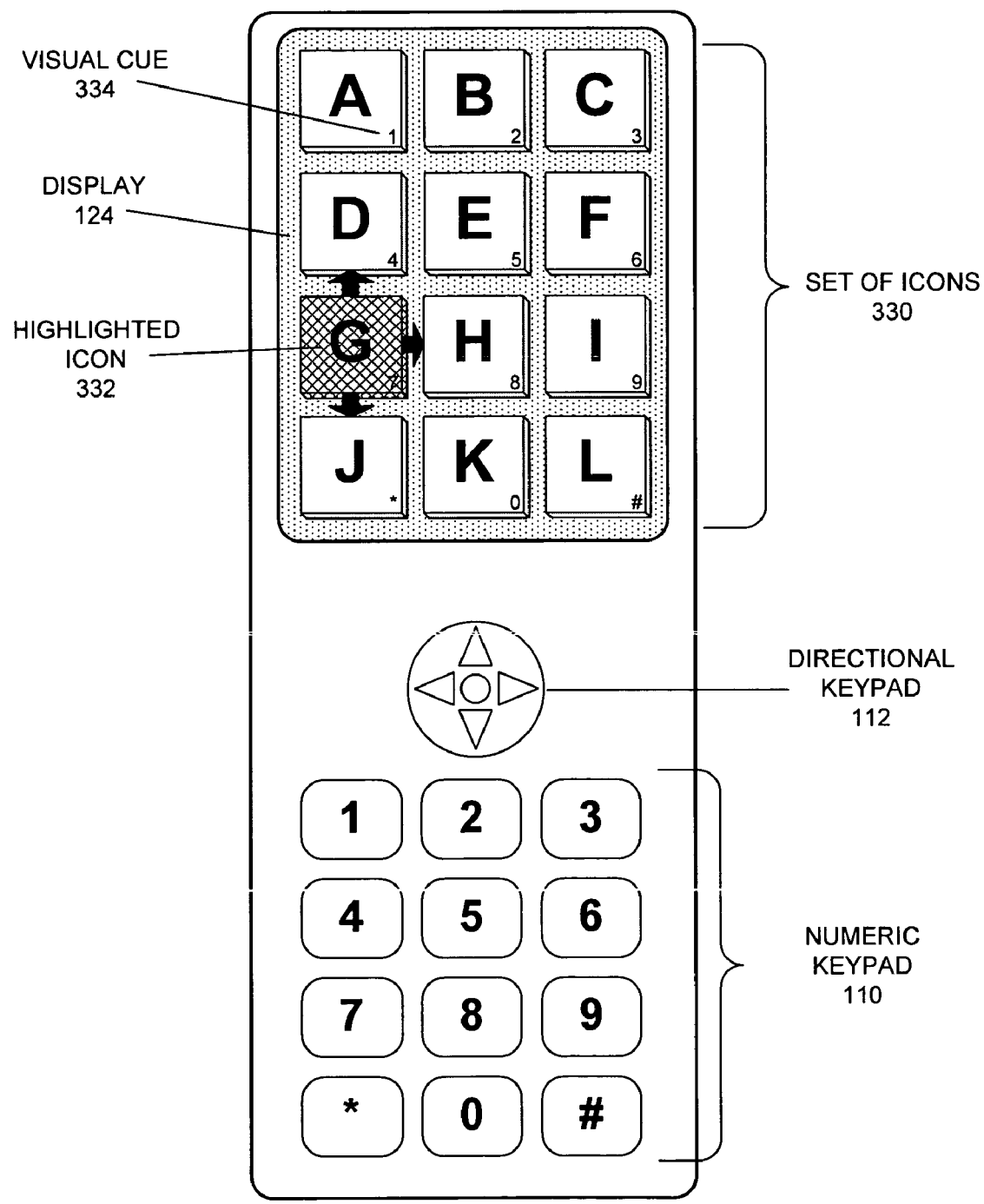
FIG. 3 illustrates the presentation of a set of icons to the user in a display in accordance with an embodiment of the present invention.
Figure 4:
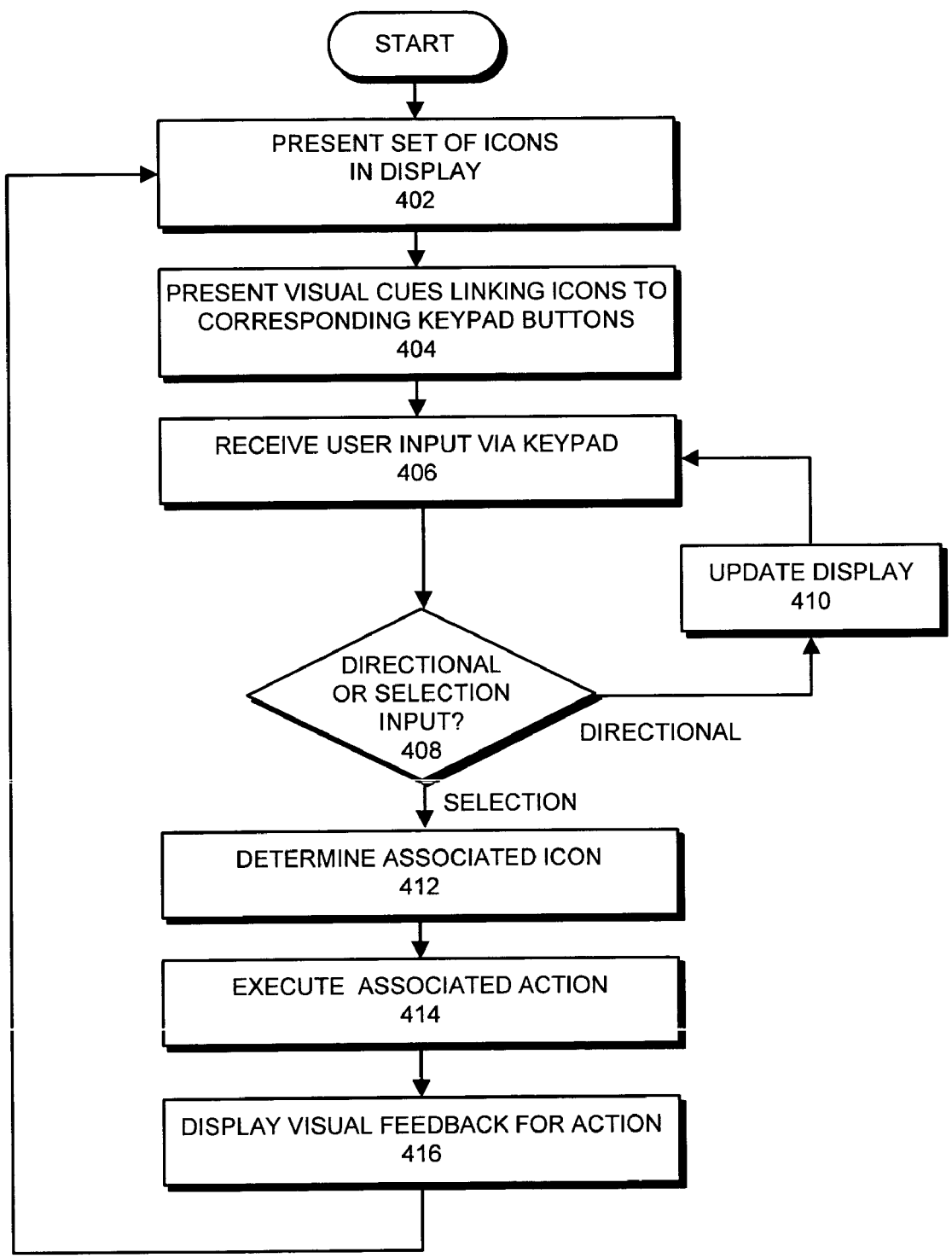
FIG. 4 is a flow chart illustrating the process of presenting a set of icons and selecting an icon in accordance with an embodiment of the present invention.

FIG. 3 illustrates the process of presenting a set of icons to the user in a display in accordance with an embodiment of the present invention. These icons can include but are not limited to three-dimensional images. FIG. 4 is a flow chart illustrating the process of presenting a set of icons and selecting an icon in accordance with an embodiment of the present invention. Referring to FIG. 4, the system first presents a set of icons 330 (step 402) in a display. These icons are presented in the display in the same spatial layout as the layout of the keypad, in order to make the selection process simple and intuitive. A set of visual cues 334 linking the icons to the corresponding keypad buttons is also displayed (step 404) to emphasize the mapping between the icon layout and keypad. In one embodiment of the present invention, the illustrated instance of FIG. 3 displays a set of icons in the same format as a numeric keypad 110, with the visual cues comprising the characters found on a typical numeric keypad.

When the system receives user input via a keypad press (step 406), it must first determine whether the input is directional or a selection (step 408). In one embodiment of the present invention, the directional keypad 112 can be used to highlight an icon, and key presses on the directional keypad can then be used to either select or change the highlighted icon 332. In the case of a key press that changes the highlighted icon, the display is updated (step 410) to reflect the change in highlighting.

In the case of a selection input, the system must determine the icon associated with the selection (step 412). In the case of a numeric keypad selection event, the selected icon is the icon that corresponds spatially with the key pressed on the numeric keypad. In the case of a directional keypad selection event, the selected icon is the highlighted icon.

Upon the selection of an icon, an action associated with the icon is executed (step 414). The result of this action can include the display of visual feedback that relates to the action (step 416) and give the user context to the status of the action.

Selection from Hierarchical Sets of Icons

In the case where there are a large number of choices available on the device, efficiently using the screen to select one specific target application to launch becomes difficult. FIGS. 5, 6A, 6B, 7A, 7B, and 8 illustrate different graphical mechanisms to display and select from a hierarchical set of icons using the method described in the claims.

Figure 5:
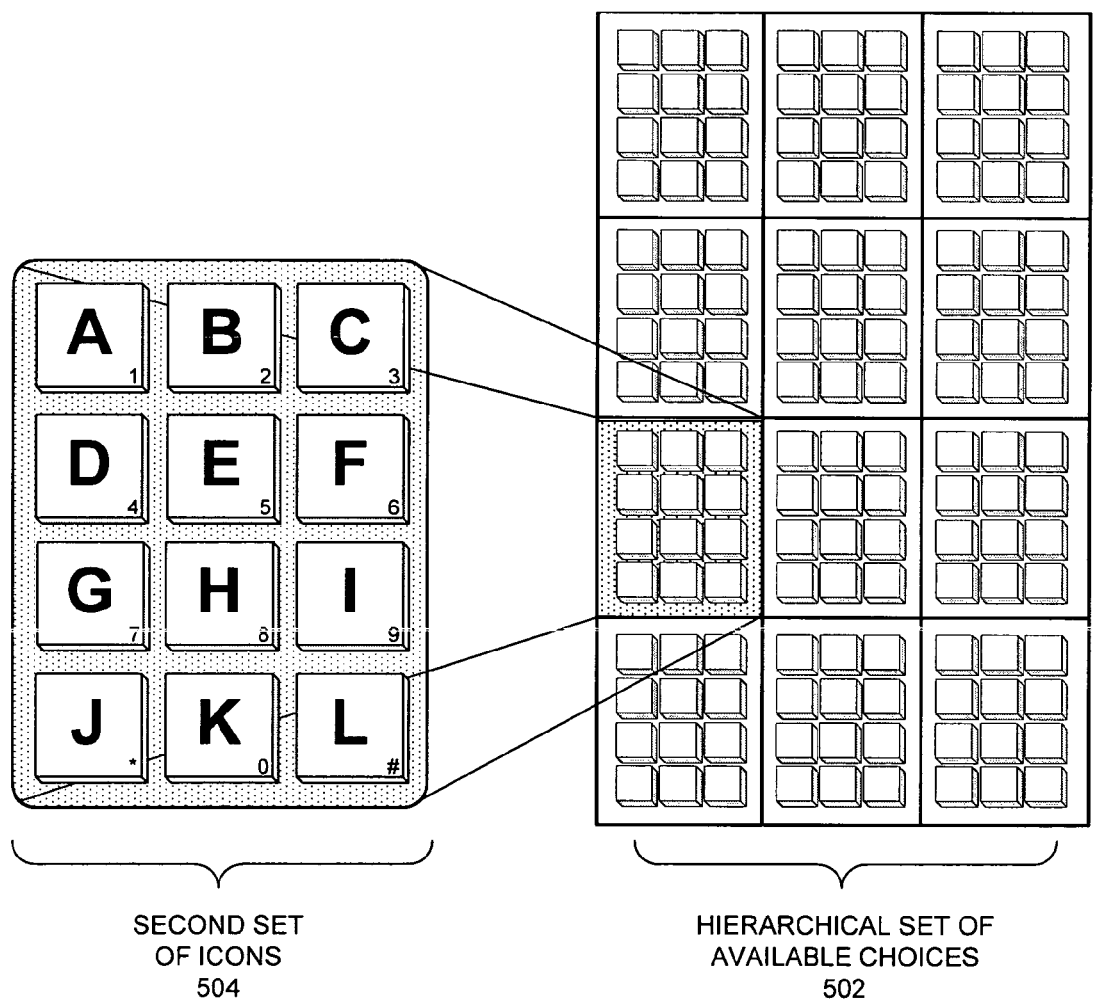
FIG. 5 illustrates a two-level hierarchy for sets of icons in accordance with an embodiment of the present invention.

FIG. 5 illustrates a two-level hierarchy, where the set of choices is partitioned into a hierarchical set of available choices 502. The hierarchy is arranged to follow the same spatial layout properties described previously. After a first selection among the initial set of icons, the action executed is the presentation to the user of a second set of icons 504 corresponding to a subset of the hierarchical set. A graphical transition between the two selections gives the user visual feedback and provides a smooth context switch from one selection process to the next. Furthermore, in one embodiment of the invention, different background images can be displayed for each set of icons to give the user a visual context indicating where in the hierarchy the current set of icons resides.

Figure 6A:
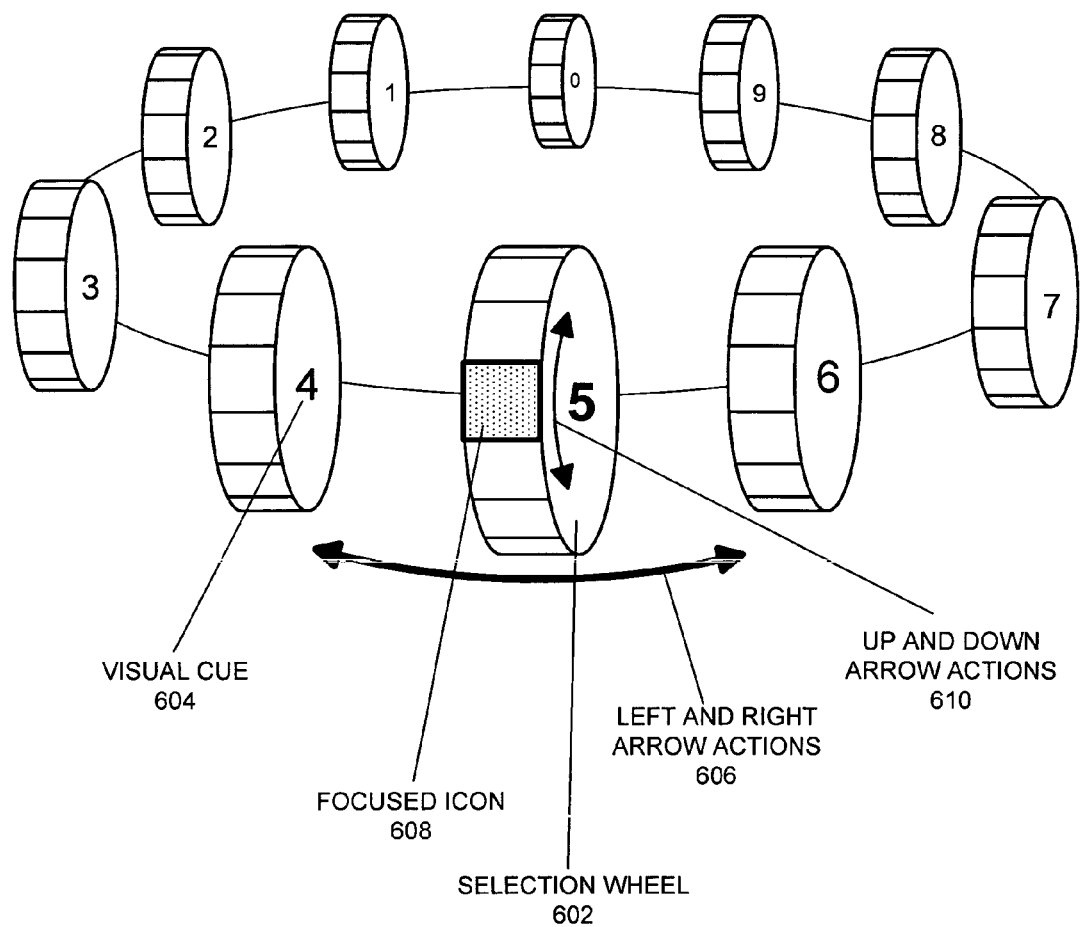
FIG. 6A illustrates an alternative mechanism for displaying hierarchical sets of icons using a set of wheels arranged on the horizontal plane in accordance with an embodiment of the present invention.

FIG. 6A illustrates an alternative mechanism for displaying hierarchical sets of icons using "wheels." A set of icons is mapped onto each wheel. A selection wheel 602 is prominently displayed in the center of the display. The left and right arrow actions 606 can be triggered via the directional keypad to rotate the set of wheels in three-dimensional space so that background wheels can be brought to the forefront. Alternatively, the numeric keypad provides shortcuts to bring background wheels to the selection position. Each wheel has a visual cue 604 that corresponds to a numeric keypad press. When the corresponding key is pressed, the plane of wheels rotates to make the cued wheel become the selection wheel.

A focused item 608 on the front of the selection wheel is highlighted to indicate the current candidate for selection. Up and own actions 610 can be triggered via the directional keypad to change the focused icon to other icons within the same wheel. The reception of a selection command results in the selection of the focused icon.

Figure 6B:
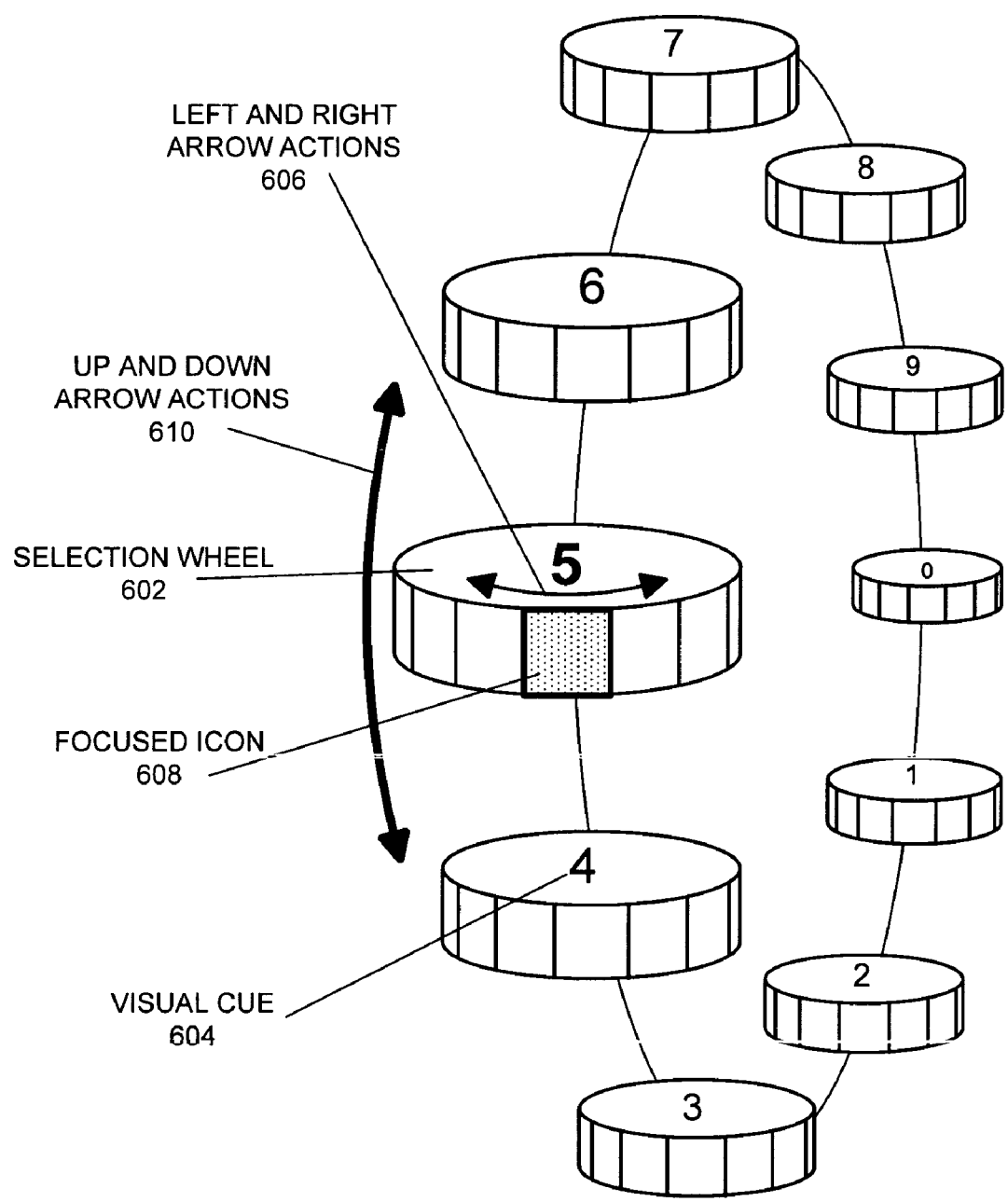
FIG. 6B illustrates an alternative mechanism for displaying hierarchical sets of icons using a set of wheels arranged on the vertical plane in accordance with an embodiment of the present invention.

FIG. 6B illustrates a similar set of wheels as those in FIG. 6A, but with the wheels arranged in a vertical plane. In this case, the up and down directional inputs rotate the wheels in the plane of wheels, while the right and left directional inputs rotate the individual selection wheel.

FIG. 7A illustrates a mechanism for displaying sets of icons or applications using a book metaphor. A currently running application 704 or a set of icons are presented on the display to resemble the pages of a book. Suspended and background applications 706, as well as hierarchical sets of icons, can be portrayed as pages that flip back and forth using three-dimensional graphics techniques. The book pages are displayed on top of a background image 702 that can also be incorporated into the metaphor. Graphical transitions between applications or hierarchical sets of icons can be animated to mirror the familiar action of turning pages in a book or adding a new page to the book when a new application is launched, thus keeping the user aware of application status and system context.

FIG. 8 illustrates planes containing sets of icons layered over each other and rendered using translucency so that multiple icon planes 802 are simultaneously visible.

In a further embodiment of the present invention, the system tracks how often each icon in the set of icons has previously been chosen. This information is stored and then used later to optimize the presentation of commonly used icons, for instance by moving them to a higher level in the hierarchy or mapping them to the particularly beneficial keys on the keypad.

Switching Between Multiple Applications

Smoothly transitioning between multiple applications on a device with a small screen is a challenge. Operations such as opening a new application without completely blocking an already-running application, handling application interruptions (e.g., to receive a phone call), and bringing user attention to applications awaiting input all require the user to know what is currently running on the system.

Figure 9A:
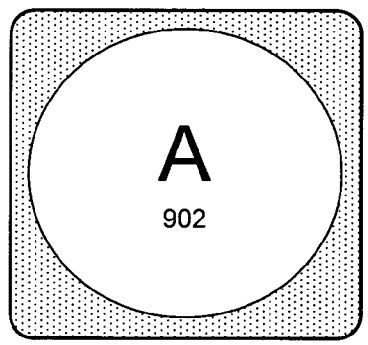
FIG. 9A illustrates the first step of a transition between two running applications positioned in a 3D manner by simulating view (eye point) movement in 3D space in accordance with an embodiment of the present invention.
Figure 9B:
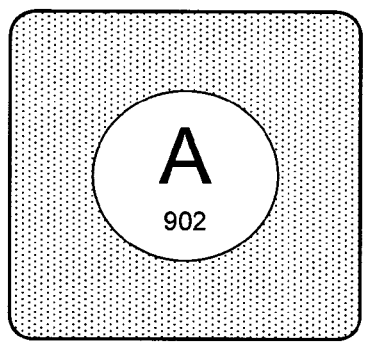
FIG. 9B illustrates the second step of a transition between two running applications positioned in a 3D manner by simulating view (eye point) movement in 3D space in accordance with an embodiment of the present invention.
Figure 9C:
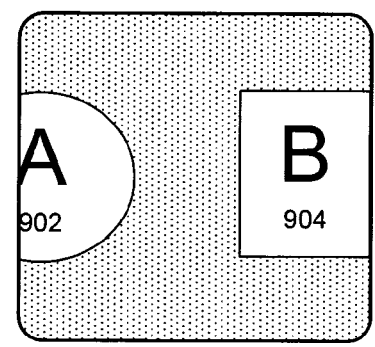
FIG. 9C illustrates the third step of a transition between two running applications positioned in a 3D manner by simulating view (eye point) movement in 3D space in accordance with an embodiment of the present invention.
Figure 9D:
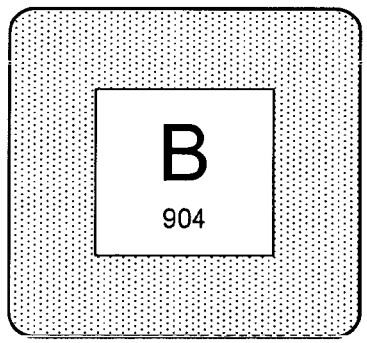
FIG. 9D illustrates the fourth step of a transition between two running applications positioned in a 3D manner by simulating view (eye point) movement in 3D space in accordance with an embodiment of the present invention.
Figure 9E:
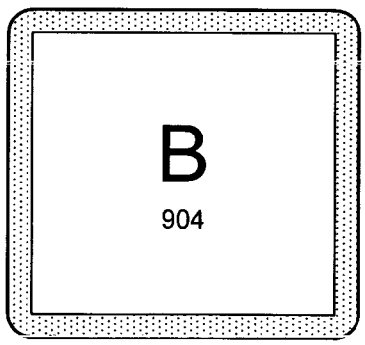
FIG. 9E illustrates the fifth step of a transition between two running applications positioned in a 3D manner by simulating view (eye point) movement in 3D space in accordance with an embodiment of the present invention.

Three-dimensional graphics techniques can be used to give the user a clear view of application interactions. FIGS. 9A, 9B, 9C, 9D, and 9E display the transition between two running applications positioned in a 3D manner by simulating view (eye point) movement in 3D space. Application A 902, initially active in FIG. 9A, is transformed to a smaller size (FIG. 9B), and then shifted off the side of the screen (FIG. 9C). At the same time, a different application B 904 is shifted onto the screen. Application B is initially also displayed in a smaller size as it moves (FIG. 9C and FIG. 9D), but is then transformed to full size after the transition completes (FIG. 9E). Different background images can be displayed during the process to give the user a visual context and spatial cues. This method of transition efficiently provides the user with a mental model of concurrent applications in the 3D space.

Figure 10A:
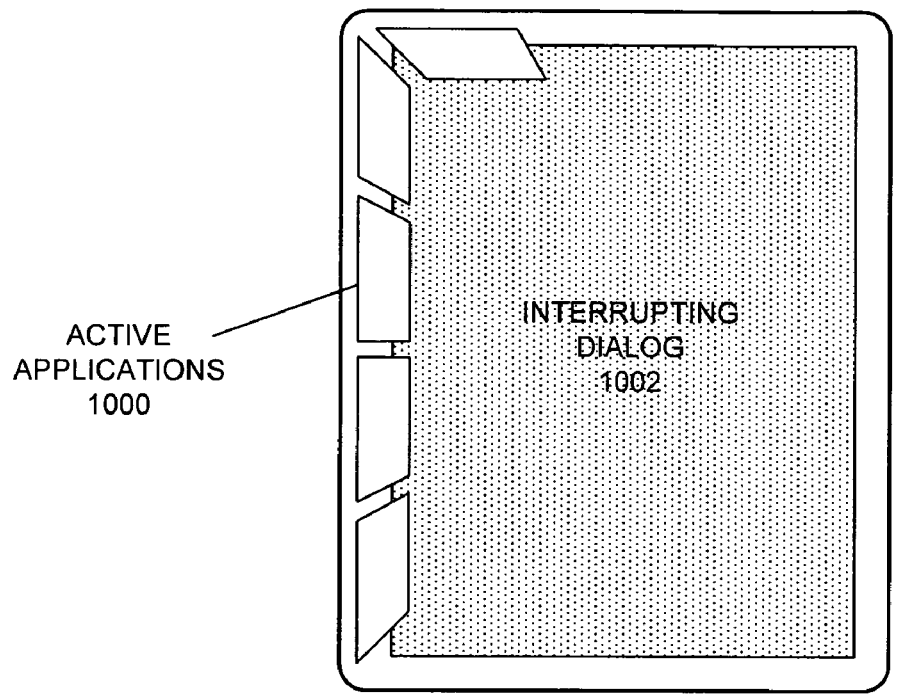
FIG. 10A illustrates a mechanism for displaying an interrupting dialog that gives the user context into the set of running applications in accordance with an embodiment of the present invention.

FIG. 10A illustrates a possible response to an interruption (e.g. a phone call or the arrival of an SMS message that results in an interrupting dialog 1002), in which a previously active application screen is pushed aside and shown in a slanted manner. Multiple active applications 1000 can be scaled down and slanted to the side of the screen in this manner to ensure that all of the applications can be shown simultaneously. The updated application view can comprise either representative icons or even miniaturized versions of the normal application. When the interrupting application finishes, the slanted application can return to the original position.

A similar representation can also be used monitor user-specified applications. Selected applications running in the background are displayed in a scaled-down manner, possibly with translucency, above the currently active application. Although the user may not be able to understand the details of the miniaturized display, changes in the three-dimensional icon display combined with the visual clues make it intuitive to recognize that a status change has occurred and expand the signaling application back into the central display area for full-screen interaction if necessary.

While the monitored and slanted applications mentioned above no long occupy the full screen, their iconized representations still can send signals to the user via techniques such as unique sound cues, vibration, and icon animation. For instance, when a miniaturized application requires attention, the representation of the application can be vibrated using animation in synchronization with the physical vibration mechanism of the device. Alternatively, the miniature version of the application may make some sound to notify the user. The position of this sound can be associated with the 3D position of the application. 3D sound can also be used purely as a sound effect, for instance to make a sound in which the sound source is flying into the screen. The sounds associated with the miniaturized applications are distinct from the sounds of the currently running application, to inform the user that an event that is unrelated to the currently focused application is occurring.

Figure 10B:
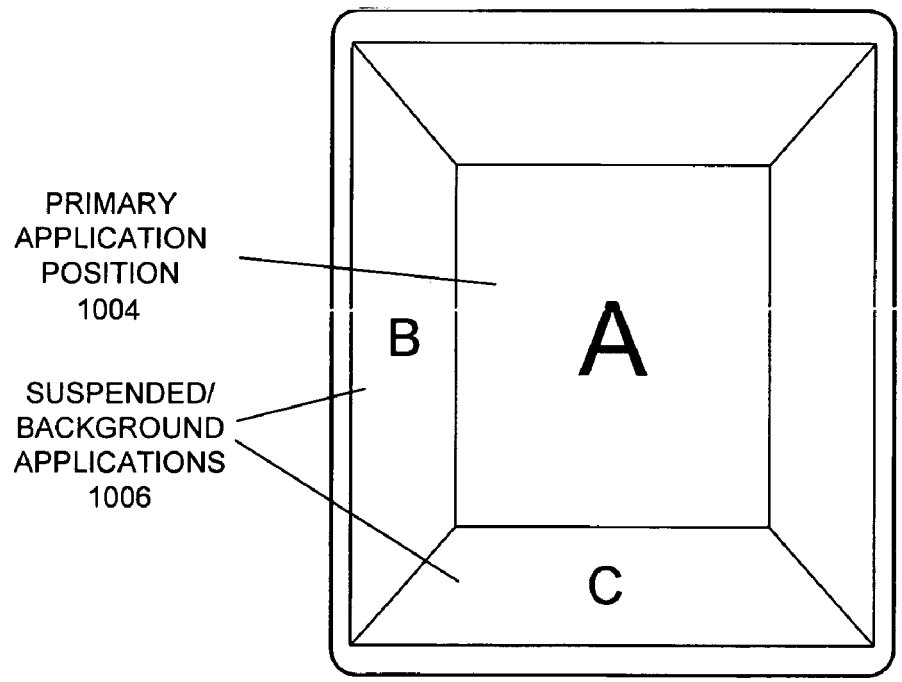
FIG. 10B illustrates a mechanism for displaying both the currently running application as well as background applications simultaneously in accordance with an embodiment of the present invention.

FIG. 10B illustrates another mechanism for displaying both currently running as well as background applications simultaneously. The system displays running applications on the 6 interior surfaces of a cube and present to the user a view from the inside of the cube. The cube can be rotated to move suspended or background applications 1006 from the sides of the cube into the primary application position 1004. Such transitions can be displayed smoothly using three-dimensional panning techniques.

FIGS. 11A, 11B, 11C, and 11D illustrate how the contents of the screen change during a transition from a primary application to an overview mode that allows the user to see all applications in a virtual 3D space. Icons presented in this overview mode can represent active or suspended applications as well as applications that can be launched. Suspended applications can be represented by a visual snapshot of the last active moment of the application. Applications available for launch can be represented by visual snapshots of previous runs or other illustrative icons.

Figure 11A:
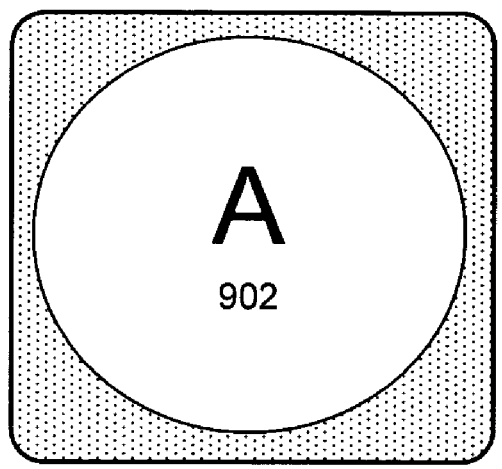
FIG. 11A illustrates the screen during the first step of a transition from a primary application to an overview mode.
Figure 11B:
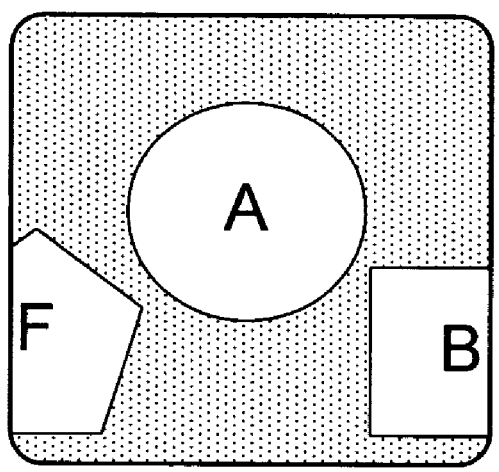
FIG. 11B illustrates the screen during the second step of a transition from a primary application to an overview mode.
Figure 11C:
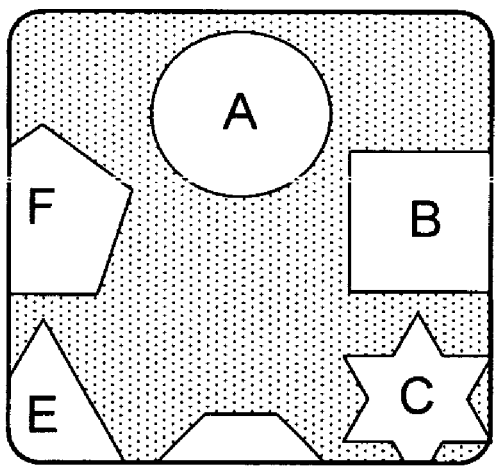
FIG. 11C illustrates the screen during the third step of a transition from a primary application to an overview mode.
Figure 11D:
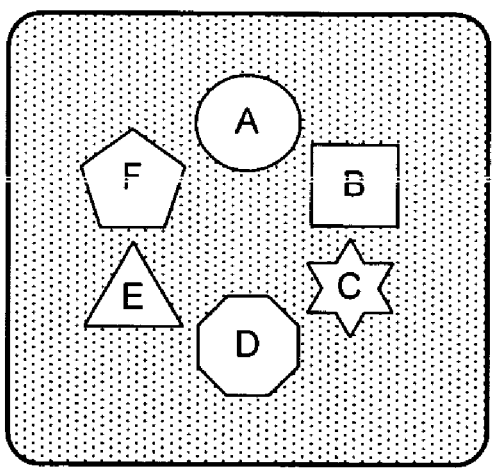
FIG. 11D illustrates the screen during the fourth step of a transition from a primary application to an overview mode.

At the beginning of the transition (FIG. 11A), application A is displayed prominently in the center of the screen. FIGS. 11B and 11C illustrate two successive moments that occur in the 3D transformation to overview mode. Application A transforms into a miniaturized version similar to those described previously, and gradually is presented in conjunction with miniaturized versions of the other applications. This smooth transition to overview mode (FIG. 11D) emphasizes the user's 3D mental model. The ability to see the current status of all of the applications in overview mode, via the miniaturized views, gives the user visual context into the current status of the system.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for presenting a set of icons associated with a first application in a display, the method comprising:
    presenting the set of icons for the first application to the user in the display so that an icon from the set of icons can be selected by a user via a keypad;
    receiving an interruption while executing the first application;
    using three-dimensional graphical display techniques to create an iconized but still-active representation of the first application on a side of the display; and
    displaying an interrupting dialog associated with the interruption in a primary area of the display;
    wherein the set of icons are presented in the display such that the spatial layout of the set of icons is substantially the same as the layout of the keypad, resulting in an intuitive interface that allows the user to select desired choices quickly and easily;
    wherein the set of icons is partitioned into a hierarchical set of icons that includes two or more levels of hierarchy;
    wherein a visualization of the complete hierarchical set of icons is displayed in the display, and wherein multiple levels of hierarchy from the hierarchical set of icons are simultaneously displayed in the display using three-dimensional graphical display techniques;
    wherein simultaneously displaying multiple levels of hierarchy from the hierarchical set of items in the display results in an intuitive interface that allows the user to select desired choices from the hierarchical set of icons quickly and easily; and
    wherein transitioning to the iconized representation of the first application allows the user to recognize intuitively that a status change has occurred and gives the user visual context into the status of the first application.

2. The method of claim 1, wherein presenting the set of icons involves presenting a visual cue in proximity to each icon that associates the icon with a corresponding button on the keypad.

3. The method of claim 1, wherein the method further comprises executing an action associated with the icon; and
    wherein executing the action involves providing visual feedback to the user, in order to provide a smooth context switch between a set of actions.

4. The method of claim 3, wherein executing the action involves presenting a visual transition that simulates view (eye point) movement in a 3D space and efficiently provides the user with a mental model of concurrent application in the 3D space.

5. The method of claim 3, space wherein executing the action involves presenting a second set of icons to the user in the display.

6. The method of claim 5, wherein presenting the set of icons in the display includes presenting a background image;
    wherein presenting the second set of icons in the display includes presenting a second background image; and
    wherein changing background images provides context to the user.

7. The method of claim 1,
    wherein the display has a currently-focused icon which is highlighted;
    wherein selecting the icon involves transferring the highlight from the currently-focused icon to the selected icon; and
    wherein a set of directional buttons on the keypad allow the user to transfer the highlight to the icon.

8. The method of claim 1, wherein the keypad can include:
    a telephone keypad; or
    a touch-sensitive display device.

9. The method of claim 1, wherein the set of icons can include three-dimensional images.

10. The method of claim 1, wherein the set of icons can include multiple planes of icons layered over each other and rendered using translucency so that the multiple planes of icons are simultaneously visible.

11. The method of claim 1, wherein the method further comprises tracking how often each icon in the set of icons has previously been chosen, and using this information to optimize future presentation of the set of icons.

12. A computer-readable storage medium storing instructions that when executed by a computer cause the computer to perform a method for presenting a set of icons associated with a first application in a display, the method comprising:
    presenting the set of icons for the first application to the user in the display so that an icon from the set of icons can be selected by a user via a keypad;
    receiving an interruption while executing the first application;
    using three-dimensional graphical display techniques to create an iconized but still-active representation of the first application on a side of the display; and
    displaying an interrupting dialog associated with the interruption in a primary area of the display;

wherein the set of icons are presented in the display such that the spatial layout of the set of icons is substantially the same as the layout of the keypad, resulting in an intuitive interface that allows the user to select desired choices quickly and easily;

wherein the set of icons is partitioned into a hierarchical set of icons that includes two or more levels of hierarchy;

wherein a visualization of the complete hierarchical set of icons is displayed in the display, and wherein multiple levels of hierarchy from the hierarchical set of icons are simultaneously displayed in the display using three-dimensional graphical display techniques;

wherein simultaneously displaying multiple levels of hierarchy from the hierarchical set of items in the display results in an intuitive interface that allows the user to select desired choices from the hierarchical set of icons quickly and easily; and wherein transitioning to the iconized representation of the first application allows the user to recognize intuitively that a status change has occurred and gives the user visual context into the status of the first application.

13. The computer-readable storage medium of claim 12, wherein presenting the set of icons involves presenting a visual cue in proximity to each icon that associates the icon with a corresponding button on the keypad.

14. The computer-readable storage medium of claim 12, wherein the method further comprises executing an action associated with the icon; and wherein executing the action involves providing visual feedback to the user, in order to provide a smooth context switch between a set of actions.

15. The computer-readable storage medium of claim 14, wherein executing the action involves presenting a visual transition that simulates view (eye point) movement in a 3D space and efficiently provides the user with a mental model of concurrent applications in the 3D space.

16. The computer-readable storage medium of claim 14, wherein executing the action involves presenting a second set of icons to the user in the display.

17. The computer-readable storage medium of claim 16, wherein presenting the set of icons in the display includes presenting a background image;

wherein presenting the second set of icons in the display includes presenting a second background image; and wherein changing background images provides context to the user.

18. The computer-readable storage medium of claim 12, wherein the display has a currently-focused icon which is highlighted;

wherein selecting the icon involves transferring the highlight from the currently-focused icon to the selected icon; and wherein a set of directional buttons on the keypad allow the user to transfer the highlight to the icon.

19. The computer-readable storage medium of claim 12, wherein the keypad can include:
a telephone keypad; or
a touch-sensitive display device.

20. The computer-readable storage medium of claim 12, wherein the set of icons can include three-dimensional images.

21. An apparatus for presenting a set of icons associated with a first application in a display, comprising:

a display mechanism configured to present a set of icons for the first application to the user; and an input mechanism configured to select an icon from the set of icons based on user input from a keypad;

wherein the set of icons are presented in the display such that the spatial layout of the set of icons is substantially the same as the layout of the keypad, resulting in an intuitive interface that allows the user to select desired choices quickly and easily;

wherein the set of icons is partitioned into a hierarchical set of icons that includes two or more levels of hierarchy;

wherein a visualization of the complete hierarchical set of icons is displayed in the display, and wherein multiple levels of hierarchy from the hierarchical set of icons are simultaneously displayed in the display using three-dimensional graphical display techniques;

wherein simultaneously displaying multiple levels of hierarchy from the hierarchical set of items in the display results in an intuitive interface that allows the user to select desired choices from the hierarchical set of icons quickly and easily;

wherein the display mechanism is further configured to receive an interruption while presenting the set of icons, and is configured to respond to the interruption by:
using three-dimensional graphical display techniques to create an iconized but still-active representation of the first application on a side of the display; and
displaying an interrupting dialog associated with the interruption in a primary area of the display; and wherein transitioning to the iconized representation of the first application allows the user to recognize intuitively that a status change has occurred and gives the user visual context into the status of the first application.

22. The method of claim 1, wherein the set of icons is associated with a first application, wherein the method further comprises:

receiving a request to display a second application; and transitioning the display from the first application to the second application using three-dimensional graphical display techniques that transform the size and/or background of the display of the first application and/or the second application during the transition to give the user a visual context for the concurrent applications and the switch between the applications.

* * * * *

UNITED STATES PATENT AND TRADEMARK OFFICE
CERTIFICATE OF CORRECTION

PATENT NO.          : 7,487,467 B1
APPLICATION NO.  : 11/159951
DATED                  : February 3, 2009
INVENTOR(S)         : Hideya Kawahara et al.

Page 1 of 1

It is certified that error appears in the above-identified patent and that said Letters Patent is hereby corrected as shown below:

In claim 4 (at column 8, line 2), please replace the word "application" with the word --applications--.

Signed and Sealed this

Thirty-first Day of March, 2009

JOHN DOLL
*Acting Director of the United States Patent and Trademark Office*